US010268213B1

(12) United States Patent
Addona et al.

(10) Patent No.: US 10,268,213 B1
(45) Date of Patent: Apr. 23, 2019

(54) CHECK VALVE WITH PILOT TUBE PRESSURE SENSING

(71) Applicant: The United States of America as represented by the Administrator of NASA, Washington, DC (US)

(72) Inventors: Brad M Addona, Huntsville, AL (US); James A Richard, Grant, AL (US); Richard J Joye, Huntsville, AL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/789,736

(22) Filed: Oct. 20, 2017

(51) Int. Cl.
| | |
|---|---|
| *F16K 15/00* | (2006.01) |
| *G05D 16/06* | (2006.01) |
| *F16K 15/02* | (2006.01) |
| *F16K 31/126* | (2006.01) |
| *F16K 17/04* | (2006.01) |
| *F16K 15/14* | (2006.01) |

(52) U.S. Cl.
CPC ....... *G05D 16/0619* (2013.01); *F16K 15/026* (2013.01); *F16K 15/145* (2013.01); *F16K 17/0413* (2013.01); *F16K 31/1262* (2013.01)

(58) Field of Classification Search
CPC ... G05D 16/0619; F16K 15/026; F16K 15/02; F16K 15/145; F16K 17/0413; F16K 31/1262
USPC .... 137/488, 510, 505, 512, 514, 846, 514.3, 137/514.7
See application file for complete search history.

(56) References Cited

U.S. PATENT DOCUMENTS

| | | | | | |
|---|---|---|---|---|---|
| 1,402,926 | A | * | 1/1922 | Frankenberg | F25B 41/062 137/505.18 |
| 1,999,697 | A | * | 4/1935 | Kleckner | G05D 16/0619 137/115.14 |
| 2,079,915 | A | * | 5/1937 | Midyette Jr. | F24D 19/1003 137/503 |
| 2,194,749 | A | * | 3/1940 | Gregg | G05D 16/0619 137/506 |
| 2,392,178 | A | * | 1/1946 | Paget | F16K 1/48 137/510 |
| 2,766,593 | A | * | 10/1956 | Mitchell | F25B 41/043 137/509 |
| 3,088,487 | A | * | 5/1963 | Peters | F16K 31/363 137/503 |

(Continued)

*Primary Examiner* — Minh Q Le
(74) *Attorney, Agent, or Firm* — James J. McGroary; Mark P. Dvorscak

(57) ABSTRACT

A check valve's housing has a valve disposed therein to open or close a flow path from the housing's inlet to its outlet based on a difference between pressures at the inlet and outlet. The valve includes a bellows, a poppet, and a spring. The poppet includes a hollow structure extending through the poppet's plate and terminating in a first open end disposed within the bellows, an annular flange between the second face of the poppet's plate and the housing's outlet, and an open-ended tube extending from the annular flange into the housing's outlet. The spring, disposed within the hollow tubular structure, positions the annular flange to seal the outlet when the pressure difference is less than a predetermined amount and compresses when the difference exceeds the predetermined amount wherein the annular flange is unsealed from the housing's outlet to open the flow path.

15 Claims, 3 Drawing Sheets

(56) References Cited

U.S. PATENT DOCUMENTS

| | | | | |
|---|---|---|---|---|
| 3,637,187 | A | * | 1/1972 | Burger ............... F16K 31/1262 |
| | | | | 251/282 |
| 4,766,929 | A | * | 8/1988 | Yaindl .................. F16J 15/062 |
| | | | | 137/514.3 |
| 5,597,009 | A | | 1/1997 | Scherrer et al. |
| 5,984,645 | A | * | 11/1999 | Cummings ............ F04B 39/00 |
| | | | | 137/510 |
| 6,050,292 | A | * | 4/2000 | Richman ............ F16K 31/1266 |
| | | | | 137/495 |
| 6,481,418 | B1 | * | 11/2002 | Ristich .................. F02M 69/54 |
| | | | | 123/457 |
| 6,978,799 | B2 | | 12/2005 | Kugelev et al. |
| 8,356,693 | B2 | * | 1/2013 | Franconi ............... B64D 13/02 |
| | | | | 184/5.1 |
| 2009/0242043 | A1 | * | 10/2009 | Lev .................. H01M 8/04201 |
| | | | | 137/505.25 |
| 2012/0047945 | A1 | | 3/2012 | Briglia et al. |

\* cited by examiner

_US 10,268,213 B1_

CHECK VALVE WITH PILOT TUBE PRESSURE SENSING

ORIGIN OF THE INVENTION

The invention described herein was made in the performance of work under a NASA contract and by an employee of the United States Government and is subject to the provisions of Section 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

1. Field of the Invention

This invention relates to check valves. More specifically, the invention is check valve using a pilot tube for sensing pressure at the valve's outlet in order to control the opening and closing of the valve.

2. Description of the Related Art

Check valves are required in a variety of cryogenic applications ranging from manufacturing processes to aerospace launch vehicles. For applications requiring a low cracking pressure as well as a high operating pressure, leakage through a check valve's seat region is a problem. In general, the leakage problem is created since only a small force can be applied to keep a check valve seated in order to satisfy the cracking pressure requirement. In manufacturing applications, cryogenic fluid leakage/loss leads to increased manufacturing costs. In aerospace launch vehicle applications, cryogenic fluid leakage/loss negatively impacts launch vehicle capabilities.

SUMMARY OF THE INVENTION

Accordingly, it is an object of the present invention to provide a check valve.

Another object of the present invention is to provide a check valve for use in cryogenic applications.

Other objects and advantages of the present invention will become more obvious hereinafter in the specification and drawings.

In accordance with the present invention, a check valve includes a housing having a plenum, an inlet in fluid communication with the plenum, and an outlet in fluid communication with the plenum. A valve disposed in the housing opens a flow path from the inlet to the outlet via the plenum when a difference between a first fluid pressure at the inlet and a second fluid pressure at the outlet exceeds a predetermined amount, and closes the flow path when the difference is less than the predetermined amount. The valve includes a bellows having a first axial end and a second axial end with the first axial end being coupled to the housing. A poppet includes a plate having a first face coupled to the second axial end of the bellows. The plate has a second face in fluid communication with the plenum. The poppet further includes a hollow tubular structure extending through the plate and terminating in a first open end disposed within the bellows. The hollow tubular structure includes an annular flange between the second face of the plate and the outlet in the housing. The hollow tubular structure also includes an open-ended tube extending from the annular flange into the housing's outlet. A spring disposed within the hollow tubular structure positions the annular flange to seal the outlet when the difference is less than the predetermined amount. The spring compresses when the difference exceeds the predetermined amount wherein the annular flange is unsealed from the housing's outlet to open the flow path.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
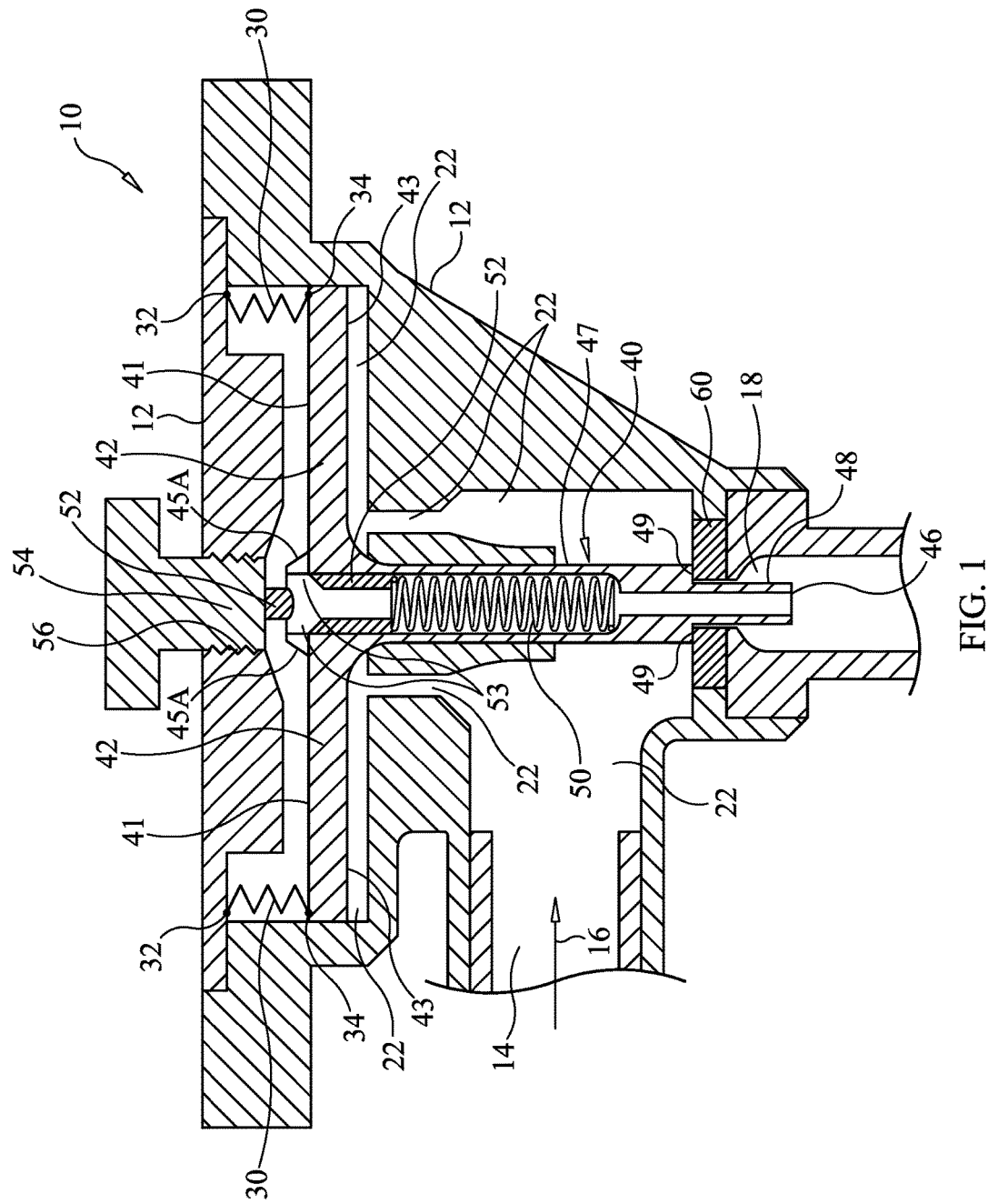
FIG. 1 is a cross-sectional view of a check valve in accordance with an embodiment of the present invention shown in its closed position.
Figure 2:
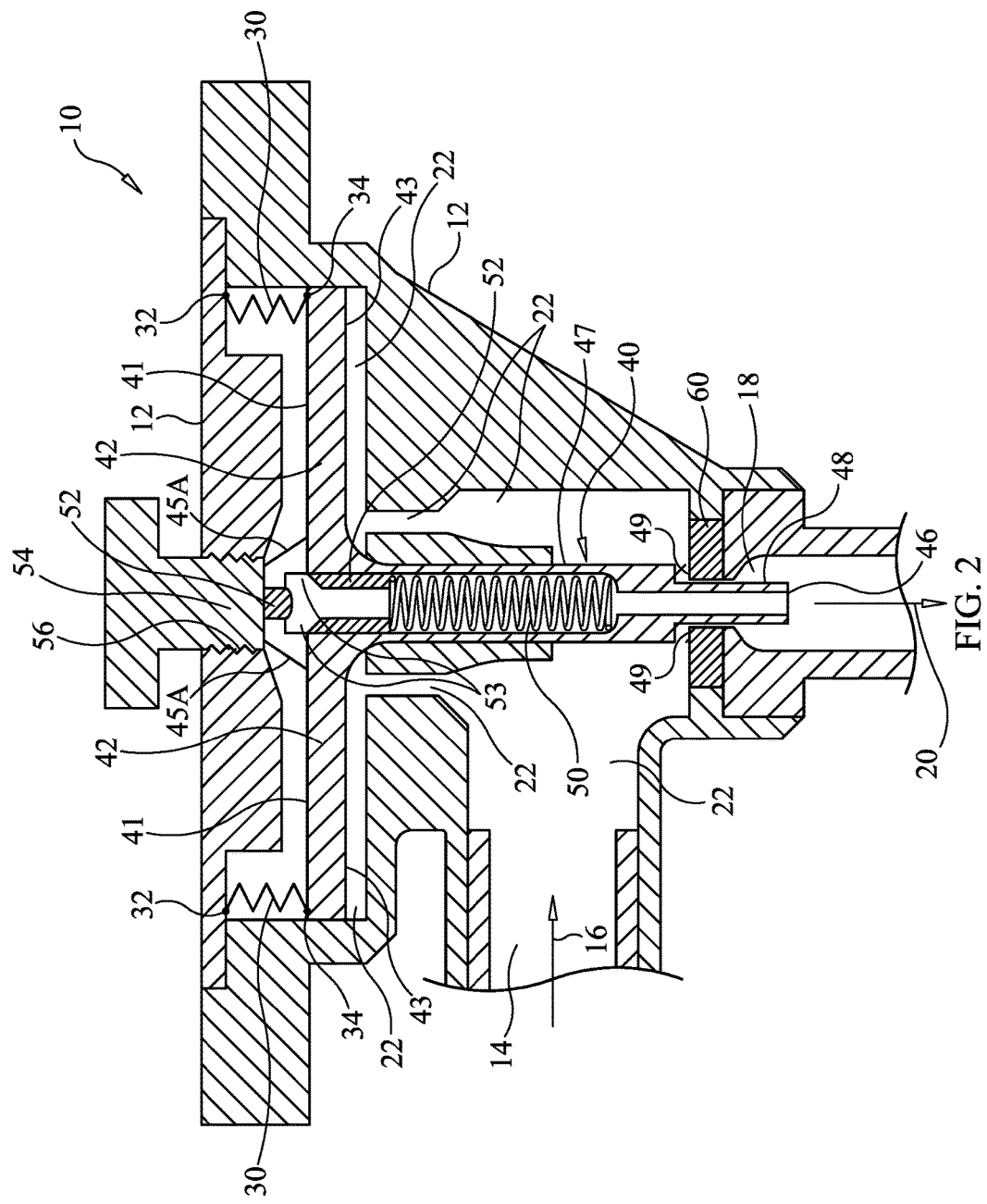
FIG. 2 is a cross-sectional view of the check valve shown in its open position.

Referring now to the drawings, simultaneous reference will be made to FIGS. 1 and 2 where a check valve in accordance with an embodiment of the present invention is shown and is referenced generally by numeral 10. FIG. 1 depicts check valve 10 in its closed position, and FIG. 2 depicts check valve 10 in its open position. As will be explained further below, check valve 10 is sensitive to opening at low cracking pressures without being subject to leakage when it is closed. Accordingly, check valve 10 is well-suited for use in cryogenic fluid applications.

Check valve 10 includes a housing 12 that, in general, defines a fluid flow path through housing 12 and supports a valve assembly of the present invention that controls the opening/closing of the fluid flow path predicated on a pressure differential across the valve. The specific shape, size, and materials used for housing 12 are not limitations of the present invention. For example, housing 12 can be constructed using multiple pieces with seals (omitted from the figures for sake of clarity) being provided between the pieces as necessary and as would be well understood in the art.

Housing 12 has an inlet 14 provided with an incoming fluid flow under pressure as indicated by arrow 16. Housing 12 has an outlet 18 for emitting a fluid flow passing through housing 12 when the valve (disposed in housing 12) is open (FIG. 2) where the emitted fluid flow is indicated by arrow 20. Between inlet 14 and outlet 18, housing 12 defines a plenum 22 in fluid communication with parts of the valve as will be explained later below. The various regions of the plenum are referenced by numeral 22. Even when the valve is closed (FIG. 1), there is fluid at its accompanying pressure at outlet 18. As will be explained further below, the valve of the present invention constantly senses the pressure differential between the fluid at inlet 14 and the fluid at outlet 18 to prevent any fluid from flowing from inlet 14 to outlet 18 (FIG. 1), or to allow fluid to flow from inlet 14 to outlet 18 (FIG. 2).

Figure 3:
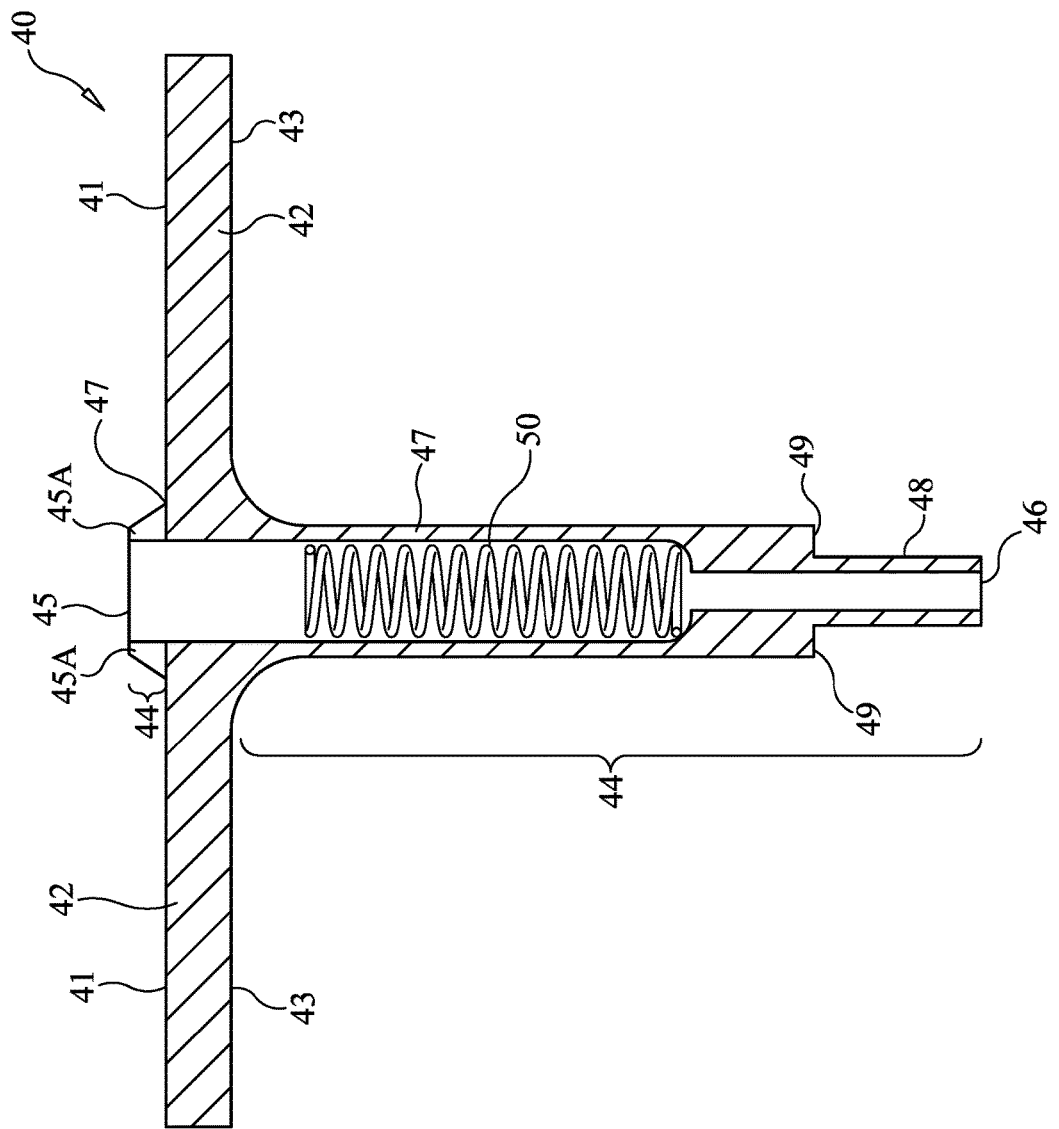
FIG. 3 is an isolated cross-sectional view of the check valve's poppet and internally-installed spring in accordance with an embodiment of the present invention.

The valve of the present invention includes a bellows 30, a poppet 40, and a spring 50, with poppet 40 and spring 50 being illustrated in isolation in FIG. 3. Bellows 30 is a cylindrical bellows having one axial end 32 affixed to housing 12 and its opposing axial end 34 affixed to poppet 40. More specifically, axial end 34 is affixed to a first face 41 of the poppet's plate 42. A second face 43 of plate 42 is exposed to fluid and the pressure thereof present in plenum 22.

Poppet 40 also includes a hollow tubular structure 44 (FIG. 3) that extends through plate 42 and has opposing open axial ends 45 and 46. Tubular structure 44 is fixedly coupled to or integrated with plate 42. Tubular structure 44 includes tubes 47 and 48 coupled to or integrated with one another such that the combination thereof is a unitary structure. Tube 47 extends through plate 42 and tube 48 extends from one end of tube 47. Tube 48 has a smaller inside and outside diameter than tube 47 such that an annular flange 49 is defined about tube 48 where it interfaces with tube 47. Open end 45 is defined at the outboard end of tube 47 and resides in bellows 30. Open end 45 can have one or more slots 45A to facilitate the egress of fluid under pressure into bellows 30 as will be described further below. Open end 46 is defined at the outboard end of tube 48 and resides in outlet 18.

Spring 50 is disposed within tube 47 and provides a controlling force to position poppet 40 such that flange 49 seats/seals against a valve seat 60 positioned at outlet 18 when the valve is closed (FIG. 1), i.e., the fluid pressure at outlet 18 is greater than the fluid pressure at inlet 14 by some predetermined amount dictated by the force applied by spring 50. However, when the fluid pressure at inlet 14 is greater than the fluid pressure at outlet 18 by the predetermined amount governed by spring 50, the valve is opened (FIG. 2).

One axial end of spring 50 is seated inside tube 47 adjacent flange 49. The other axial end of spring 50 is held in compression by a flow-through end cap 52 bearing against a stop 54 fitted into housing 12. End cap 52 bears against spring 50 inside of tube 47. End cap 52 extends from axial end 45 to bear against stop 54 inside of bellows 30. End cap 52 defines fluid passageways 53 leading to slots 45A in open axial end 45. Stop 54 can be threaded into housing 12 (as indicated by threads 56) such that the position of stop 54 can be adjusted thereby adjusting the amount of movement of poppet 40.

In use, check valve 10 is opened (FIG. 2) when the fluid pressure at outlet 18 is less than the fluid pressure at inlet 14 by an amount dictated by the spring force of spring 50 as will be explained further below. Throughout the opened state of the check valve, fluid pressure at outlet 18 is provided to the inside of bellows 30 to bear against face 41 of poppet 40. That is, fluid at outlet 18 passes through open axial end 46, tube 48, tube 47, open axial end 45 via slots 45A, and into bellows 30. At the same time, fluid pressure at inlet 14 and plenum 22 bears against face 43 of poppet 40. As long as the pressure differential across plate 42 allows spring 50 to remain compressed, check valve 10 will remain open to emit fluid flow 20. Throughout this open-valve flow process, the fluid pressure at outlet 18 is provided at face 41 of poppet 40 to essentially continually monitor the pressure at outlet 18.

When the pressure at outlet 18 is greater than the pressure at inlet 14 such that bellows 30 can axially expand and overcome the compression force of spring 50, poppet 40 is moved until flange 49 seats against valve seat 60 (FIG. 1) to thereby seal check valve 10. Throughout the closed state of the check valve, the pressure at outlet 18 is also constantly monitored as described above so that check valve 10 can re-open when appropriate.

The advantages of the present invention are numerous. The poppet's plate provides a large sense area while the pilot tube (i.e., tube 48) constantly provides outlet pressure to one side of the poppet's plate. The piloted operation of the valve allows sealing stress to be maintained at the poppet and seat interface at low pressures and therefore able to meet low leakage rates at cryogenic temperatures.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A check valve, comprising:
    a housing having a plenum, an inlet in fluid communication with said plenum, and an outlet in fluid communication with said plenum; and
    a valve disposed in said housing for opening a flow path from said inlet to said outlet via said plenum when a difference between a first fluid pressure at said inlet and a second fluid pressure at said outlet exceeds a predetermined amount, and for closing said flow path when said difference is less than said predetermined amount, said valve including
    a bellows having a first axial end and a second axial end, said first axial end coupled to said housing,
    a plate having a first face coupled to said second axial end of said bellows, said plate having a second face in fluid communication with said plenum,
    a first tube extending through said plate and terminating in a first open end disposed within said bellows and a second open end disposed adjacent to said outlet,
    a second tube sealed to said second open end and extending into said outlet wherein a combination of said first tube and said second tube are a singular structure, and
    a spring having a first position that biases said combination towards said outlet wherein said first tube seals said outlet when said difference is less than said predetermined amount, said spring having a second position when said difference exceeds said predetermined amount wherein said first tube is unsealed from said outlet to open said flow path, wherein said second tube extends into said outlet for said first position of said spring and said second position of said spring.

2. A check valve as in claim 1, wherein said first tube is integral with said plate.

3. A check valve as in claim 1, further comprising a stop fitted in said housing for engaging said first tube at said first open end thereof when said difference exceeds said predetermined amount.

4. A check valve as in claim 3, wherein said stop is threaded into said housing.

5. A check valve as in claim 1, further comprising at least one slot in said first tube at said first open end thereof.

6. A check valve, comprising:
    a housing having a plenum, an inlet in fluid communication with said plenum, and an outlet in fluid communication with said plenum; and
    a valve disposed in said housing for opening a flow path from said inlet to said outlet via said plenum when a difference between a first fluid pressure at said inlet and a second fluid pressure at said outlet exceeds a predetermined amount, and for closing said flow path when said difference is less than said predetermined amount, said valve including a bellows having a first axial end and a second axial end, said first axial end coupled to said housing, a poppet including a plate having a first face coupled to said second axial end of said bellows, said plate having a second face in fluid communication with said plenum, said poppet further including a hollow tubular structure extending through said plate and terminating in a first open end disposed within said bellows, said hollow tubular structure including an annular flange between said second face of said plate and said outlet, said hollow tubular structure including an open-ended tube extending from said annular flange into said outlet, and a spring disposed within said hollow tubular structure for positioning said annular flange to seal said outlet when said difference is less than said predetermined amount, and for compressing when said difference exceeds said predetermined amount wherein said annular flange is unsealed from said outlet to open said flow path.

7. A check valve as in claim 6, wherein said hollow tubular structure is integral with said plate.

8. A check valve as in claim 6, further comprising a stop fitted in said housing for engaging said first open end of said hollow tubular structure when said difference exceeds said predetermined amount.

9. A check valve as in claim 8, wherein said stop is threaded into said housing.

10. A check valve as in claim 6, further comprising at least one slot in said hollow tubular structure at said first open end thereof.

11. A check valve, comprising:

a housing having a plenum, an inlet in fluid communication with said plenum, and an outlet in fluid communication with said plenum; and a valve disposed in said housing for opening a flow path from said inlet to said outlet via said plenum when a difference between a first fluid pressure at said inlet and a second fluid pressure at said outlet exceeds a predetermined amount, and for closing said flow path when said difference is less than said predetermined amount, said valve including a bellows having a first axial end and a second axial end, said first axial end coupled to said housing, a plate having a first face coupled to said second axial end of said bellows, said plate having a second face in fluid communication with said plenum, a first tube extending through said plate and terminating in a first open end disposed within said bellows and a second open end disposed adjacent to said outlet, a valve seat disposed at said outlet, a second tube sealed to said second open end and extending through said valve seat into said outlet wherein a combination of said first tube and said second tube are a singular structure, and a spring disposed in said first tube, said spring having a first position that biases said combination towards said outlet wherein said first tube seats against said valve seat when said difference is less than said predetermined amount, said spring having a second position when said difference exceeds said predetermined amount wherein said first tube is unseated from said valve seat to open said flow path, wherein said second tube extends through said valve seat into said outlet for said first position of said spring and said second position of said spring.

12. A check valve as in claim 11, wherein said first tube is integral with said plate.

13. A check valve as in claim 11, further comprising a stop fitted in said housing for engaging said first tube at said first open end thereof when said difference exceeds said predetermined amount.

14. A check valve as in claim 13, wherein said stop is threaded into said housing.

15. A check valve as in claim 11, further comprising at least one slot in said first tube at said first open end thereof.

* * * * *